US012752339B2

(12) United States Patent
Yubuchi et al.

(10) Patent No.: US 12,752,339 B2
(45) Date of Patent: Oct. 6, 2026

(54) METHOD FOR PRODUCING NA CONTAINING OXIDE, AND NA CONTAINING OXIDE

(71) Applicant: TOYOTA JIDOSHA KABUSHIKI KAISHA, Toyota (JP)

(72) Inventors: So Yubuchi, Shizuoka-ken (JP); Jun Yoshida, Mishima (JP); Satoshi Mizutani, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 191 days.

(21) Appl. No.: 18/590,404

(22) Filed: Feb. 28, 2024

(65) Prior Publication Data

US 2024/0300015 A1 Sep. 12, 2024

(30) Foreign Application Priority Data

Mar. 6, 2023 (JP) ................................ 2023-033922

(51) Int. Cl.

*B22F 1/16* (2022.01)
*C01G 53/51* (2025.01)
*B22F 1/065* (2022.01)

(52) U.S. Cl.

CPC ................ *B22F 1/16* (2022.01); *C01G 53/51* (2025.01); *B22F 1/065* (2022.01); *B22F 2301/15* (2013.01); *B22F 2302/25* (2013.01)

(58) Field of Classification Search

CPC ........ B22F 1/16; B22F 1/065; B22F 2301/15; B22F 2302/25; C01G 53/51

See application file for complete search history.

(56) References Cited

U.S. PATENT DOCUMENTS

| | | | | |
|---|---|---|---|---|
| 9,478,804 | B2 * | 10/2016 | Park ...................... | H01M 4/366 |
| 2015/0093643 | A1 | 4/2015 | Hiratsuka | |
| 2020/0251724 | A1 * | 8/2020 | Kim ...................... | H01M 4/505 |
| 2022/0298024 | A1 | 9/2022 | Castro et al. | |

FOREIGN PATENT DOCUMENTS

| | | | |
|---|---|---|---|
| JP | 2012-201588 | A | 10/2012 |
| JP | 2015-092454 | A | 5/2015 |
| WO | 2019/117027 | A1 | 6/2019 |

* cited by examiner

*Primary Examiner* — Stuart L Hendrickson

(74) *Attorney, Agent, or Firm* — Dinsmore & Shohl LLP

(57) ABSTRACT

Disclosed is a Na containing oxide having a P2 type structure wherein O3 phase is reduced. A method for producing a Na containing oxide of the present disclosure comprises obtaining a precursor containing at least one element of Mn, Ni and Co, coating the surface of the precursor with a Na source to obtain a composite, and firing the composite to obtain the Na containing oxide having the P2 type structure, wherein the atmosphere in firing the composite contains 50% by volume or more of oxygen.

8 Claims, 2 Drawing Sheets

METHOD FOR PRODUCING NA CONTAINING OXIDE, AND NA CONTAINING OXIDE

CROSS-REFERENCE TO RELATED APPLICATIONS

This application claims priority to Japanese Patent Application No. 2023-033922 filed Mar. 6, 2023, the entire contents of which are herein incorporated by reference.

FIELD

The present application discloses a method for producing a Na containing oxide, and a Na containing oxide.

BACKGROUND

PTL 1 discloses a Na containing oxide having a P2 type structure and having a chemical composition represented by $Na_xFe_yMn_{1-y}O_2$ (x is less than 1, y is ⅓ or more and less than ⅔).

CITATION LIST

Patent Literature

[PTL 1] JP 2012-201588 A

SUMMARY

Technical Problem

In P2 type Na containing oxide, O3 phase is easily formed with P2 phase. There is a need for new techniques capable of reducing O3 phase in the Na containing oxide having the P2 type structure.

Solution To Problem

The present application discloses the following plurality of aspects for solution to the above problem.

Aspect 1

A method for producing a Na containing oxide having a P2 type structure, the method comprising:

obtaining a precursor comprising at least one element of Mn, Ni and Co, coating the surface of the precursor with a Na source to obtain a composite and firing the composite to obtain the Na containing oxide having the P2 type structure, wherein atmosphere in firing the composite comprises 50 volume % or more of oxygen.

Aspect 2

The method according to Aspect 1, wherein the precursor is a spherical particle, the composite is obtained by coating 40 area % or more of the surface of the precursor with the Na source and the Na containing oxide having the P2 type structure is a spherical particle.

Aspect 3

The method according to Aspect 1 or 2, the method comprising obtaining a precipitate as the precursor by a coprecipitation method using an ion source capable of forming the precipitate with transition metal ions in an aqueous solution and a transition metal compound comprising at least one element of Mn, Ni and Co.

Aspect 4

The method according to any one of Aspects 1 to 3, wherein the Na containing oxide having P2 type structure has a chemical composition represented by $Na_aMn_{x-p}Ni_{y-q}Co_{z-r}M_{p+q+r}O_2$ (wherein, $0<a\leq 1.00$, $x+y+z=1$, $0\leq p+q+r<0.17$, and element M is at least one of B, Mg, Al, K, Ca, Ti, V, Cr, Fe, Cu, Zn, Ga, Ge, Sr, Y, Zr, Nb, Mo and W).

Aspect 5

A Na containing oxide, having at least one element of Mn, Ni and Co; Na; and O as constituent elements, and having a P2 type structure, wherein when obtaining an X-ray diffraction pattern using CuKα for the Na containing oxide, a ratio $I_{P2}/I_{O3}$ of the diffraction peak intensity $I_{P2}$ derived from the P2 type structure in the X-ray diffraction pattern and the diffraction peak intensity $I_{O3}$ derived from an O3 type structure is 1.0 or more and 20.0 or less, and the Na containing oxide is a spherical particle.

Effects

According to the method of the present disclosure, when producing a Na containing oxide having a P2 type structure, O3 phase can be reduced.

DESCRIPTION OF EMBODIMENTS

1. Method for Producing a Na Containing Oxide Having a P2 Type Structure

Figure 1:
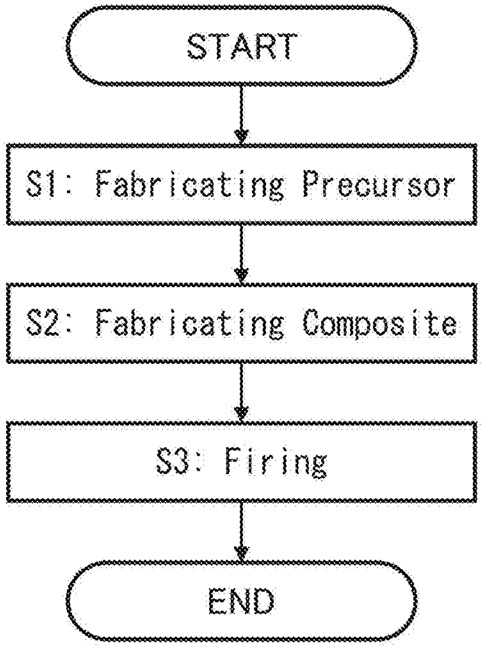
FIG. 1 shows an exemplary flow of a method for producing a Na containing oxide having a P2 type structure.

As shown in FIG. 1, a method for producing a Na containing oxide having a P2 type structure according to an embodiment includes:

(S1) obtaining a precursor containing at least one element of Mn, Ni and Co, (S2) coating the surface of the precursor with a Na source to obtain a composite, and (S3) firing the composite to obtain the Na containing oxide having the P2 type structure. Here, the atmosphere in firing the composite contains 50% by volume or more of oxygen.

1.1 S1

In S1, the precursor containing at least one element of Mn, Ni and Co is obtained. The precursor may include at least Mn and one or both of Ni and Co, or may include at least Mn, Ni and Co. The precursor may be a salt comprising at least one element of Mn, Ni and Co. For example, the precursor may be at least one of carbonate, sulfate, nitrate and acetate. Alternatively, the precursor may be a compound other than a salt. For example, the precursor may be a hydroxide. The precursor may be a hydrate. The precursor may be a combination of a plurality of types of compounds. The precursor may be in a variety of shapes. For example, the precursor may be particulate and may be a spherical particle as described later. The particle diameter of the particle composed of the precursor is not particularly limited.

In S1, an ion source capable of forming a precipitate with a transition metal ion in an aqueous solution and a transition metal compound containing at least one element of Mn, Ni and Co may be used, and a precipitate as the above-mentioned precursors may be obtained by a coprecipitation method, whereby, a spherical particle as a precursor are easily obtained. "An ion source capable of forming a precipitate with a transition metal ion in an aqueous solution" may be, for example, at least one selected from sodium salt such as sodium carbonate and sodium nitrate, sodium hydroxide, and sodium oxide. The transition-metal compound may be a salt, a hydroxide, or the like comprising at least one element of Mn, Ni and Co as described above. Specifically, in S1, the ion source and the transition-metal compound may be used to obtain a solution, and each solution may be added dropwise and mixed to obtain a precipitate as a precursor. At this time, for example, water is used as the solvent. At this time, various sodium compounds may be used as the base, and an aqueous ammonia solution or the like may be added to adjust the basicity. In the case of the coprecipitation method, for example, an aqueous solution of a transition metal compound and an aqueous solution of sodium carbonate are prepared, and each aqueous solution is added dropwise and mixed to obtain a precipitate as a precursor. Alternatively, it is also possible to obtain a precursor by a sol-gel method. Particularly, according to the coprecipitation method, spherical particles as a precursor are easily obtained.

As mentioned above, the precursor may be a spherical particle. In the present application, "a spherical particle" means a particle having a circularity of 0.80 or more. The circularity of the particle may be 0.81 or more, 0.82 or more, 0.83 or more, 0.84 or more, 0.85 or more, 0.86 or more, 0.87 or more, 0.88 or more, 0.89 or more, or 0.90 or more. The circularity of the particle is defined by $4\pi S/L^2$. Where S is the ortho-projected area of the particle and L is the perimeter of the ortho-projected image of the particle. The circularity of the particle can be determined by observing the appearance of the particle by scanning electron microscopy (SEM), transmission electron microscopy (TEM) or optical microscopy. When it is composed of a plurality of particles, its circularity is measured as an average value in the following manner, for example.

(1) First, the particle size distribution of the positive electrode active material particles is measured. Specifically, the 10% cumulative particle diameter (D10) and the 90% cumulative particle diameter (D90), in the volume-based particle size distribution by laser diffraction/scattering, are determined.

(2) The outer appearance of the positive electrode active material particles are observed in an image taken with a SEM, TEM or optical microscope, and 100 particles having a circle equivalent diameter (diameter of a circle having the same area as the orthographic area of the particle) of D10 or greater and D90 or lower as determined in (1) above are arbitrarily selected from among the particles in the image.

(3) The circularity of each of the 100 selected particles is determined by image processing, and the average is considered to be the "circularity of the positive electrode active material particles".

In S1, the precursor may contain an element M. The element M is at least one of B, Mg, Al, K, Ca, Ti, V, Cr, Cu, Zn, Ga, Ge, Sr, Y, Zr, Nb, Mo and W. The element M, for example, has a function of stabilizing the P2 type structure. A method of obtaining a precursor containing an element M is not particularly limited. When a precursor is obtained by a coprecipitation method in S1, for example, an aqueous solution of a transition-metal compound containing at least one of Mn, Ni and Co, an aqueous solution of sodium carbonate, and an aqueous solution of a compound of element M are prepared, and each aqueous solution is added dropwise and mixed, whereby a precursor containing element M together with at least one element of Mn, Ni and Co is obtained. Alternatively, in the manufacturing method of the present disclosure, the element M may not be added in S1, and the element M may be doped when Na doping firing is performed in S2 and S3 described later.

1.2 S2

In S2, the surface of the precursors obtained by S1 is coated with a Na source to obtain the composite. The Na source may be a salt containing Na such as a carbonate or a nitrate, or may be a compound other than a salt such as sodium oxide or sodium hydroxide. In S2, the quantity of Na source to be coated on the surface of the precursors may be determined by taking into account Na loss during subsequent firing.

In S2, the coverage of Na source relative to the surface of the precursors is not particularly limited. For example, in S2, the above composite may be obtained by covering 40% or more, 50% or more, 60% or more or 70% or more of the surface of the above precursor with a Na source. Here, when the precursor obtained by S1 is a spherical particle and the composite obtained by S2 is obtained by coating 40 area % or more of the surface of the precursor with Na source, Na containing oxide having a P2 type structure tends to be a spherical particle in S3 described later. When the coverage of Na source is small, the P2 type crystal tend to be abnormally grown on the surface of the composite when firing the composite, and Na containing oxide tends to be plate-like. When the coverage of Na source is large, the P2 type crystal tend to be small when firing the composite, and Na containing oxide tends to be spherical grains corresponding to the shape of the precursor.

In S2, there is no particular limitation on the way in which the surface of the above precursor is coated with the Na source. As described above, when 40 area % or more of the surface of the precursor is coated with the Na source, various methods may be adopted. Examples thereof include a tumbling (rotating) fluidized coating method and a spray drying method. That is, a coating solution in which a Na source is dissolved is prepared, and the coating solution is brought into contact with the surface of the precursor and drying the solution at the same time or after being brought into contact therewith. By adjusting the coating conditions (temperature, time, number of times, etc.), 40 area % or more of the surface of the precursor can be coated with the Na source.

In S2, the precursor may be coated with M source together with the Na source. For example, in a S2, the composite may be obtained by mixing the precursor obtained by S1, the Na source, and an M source containing at least one elements M of B, Mg, Al, K, Ca, Ti, V, Cr, Cu, Zn, Ga, Ge, Sr, Y, Zr, Nb, Mo and W. The M source may be, for example, a salt containing an element M such as a carbonate or a sulfate, or a compound other than a salt such as an oxide or a hydroxide. The amount of M source relative to the precursor may be determined depending on the chemical composition of Na containing oxide after firing.

1.3 S3

In S3, a Na containing oxide having a P2 type structure is obtained by firing the above-described composite obtained by S2. Here, the atmosphere in firing the composite contains 50% by volume or more of oxygen. Note that the term "atmosphere in firing" refers to an atmosphere in "main firing" for generating a P2 phase. When preliminary firing is performed before the main firing, the atmosphere in the preliminary firing may or may not contain 50% by volume of oxygen. When the atmosphere in both the preliminary firing and the main firing contains 50 volume % or more oxygen, it is easy to obtain a higher effect.

In S3, the above-described composite may be optionally molded and optionally preliminarily fired, and then the main firing may be performed. Preliminary firing of the composite may be performed at a temperature equal to or below the main firing temperature. For example, it is possible to perform preliminary firing at a temperature below 700° C. The pre-firing time is not particularly limited. In addition, the pre-firing atmosphere is also not particularly limited. The pre-firing atmosphere may be the same as or different from the main firing atmosphere. The pre-firing atmosphere may contain 50% by volume or more of oxygen.

In S3, the main firing of the composite may be performed, for example, at a temperature of 700° C. or more and 1100° C. or less. In some embodiments, it is 800° C. or higher and 1000° C. or less. When the main firing temperature is too low, Na doping is not performed, when the main firing temperature is too high, O3 phase or the like is likely to be generated. The temperature rising speed from the preliminary firing temperature to the main firing temperature is not particularly limited.

The main firing time is not particularly limited, and may be, for example, 30 minutes or more and 48 hours or less. However, the shapes of Na containing oxide can be controlled by the main firing times. As described above, in the method of the present disclosure, when the coverage of Na source in the composite is 40 area % or more, a small P2 type crystal is easily formed on the surface of the composite when the composite is fired. In the method of the present disclosure, a P2 type crystal is grown along the surface of the particle so that one P2 type crystallite and another P2 type crystallite are connected to each other, so that the shape of Na containing oxide corresponds to the shape of the precursor. For example, if the precursors are spherical particles, Na containing oxide can also become spherical particles. If the firing time is too short, Na doping is not performed, and P2 type structure cannot be obtained. On the other hand, if the main firing time is too long, P2 type structure is excessively grown, resulting in plate-like grains rather than spherical. As long as the present inventor has confirmed, when the main firing time is 30 minutes or more and 3 hours or less, spherical particles of Na containing oxide are easily obtained. Na containing oxide obtained after the main firing may have a structure in which a plurality of crystallites are present on the surface and the crystallites are connected to each other.

As described above, in S3, at least the firing atmosphere in the main firing contains 50% by volume or more of oxygen. According to a new finding of the present inventor, when the main firing is performed in an atmosphere in which the oxygen concentration is less than 50% by volume, such as an air atmosphere, a O3 phase tends to occur. In contrast, by increasing the oxygen-concentration at the time of firing to 50 volume % or more, while appropriately generating a P2 phase, it is possible to reduce O3 phase. Although the detailed mechanism is unknown, it is considered that, when the oxygen-concentration at the time of firing is low, some third phase is generated, and the third phase becomes a O3 phase. In S3, by the oxygen-concentration at the time of firing is 50 volume % or more, the formation of this third phase is suppressed, as a result, O3 phase is considered to be difficult to be generated.

2. Na Containing Oxide Having P2 Type Structure

By the above-described methods, it is possible to produce a Na containing oxide having a P2 type structure and having a reduced O3 phase. Hereinafter, a Na containing oxide according to an embodiment will be described.

2.1 Chemical Composition

Na containing oxide according to an embodiment includes, as a constituent element, at least one element of Mn, Ni and Co; Na; and O. In particular, when containing at least, Na and Mn, and one or both of Ni and Co, and O, in particular, when containing at least Na, Mn, Ni, Co and O, higher performance is likely to be obtained. In one embodiment, Na containing oxide having P2 type structure may have a chemical composition represented by $Na_aMn_{x-p}Ni_{y-q}Co_{z-r}M_{p+q+r}O_2$ (wherein, $0<a\leq1.00$, $x+y+z=1$, $0\leq p+q+r<0.17$, and element M is at least one of B, Mg, Al, K, Ca, Ti, V, Cr, Fe, Cu, Zn, Ga, Ge, Sr, Y, Zr, Nb, Mo and W). When Na containing oxide has such a chemical composition, P2 type structure is easily maintained. In the above chemical composition, "a" is more than 0, and may be 0.10 or more, 0.20 or more, 0.30 or more, 0.40 or more, 0.50 or more, or 0.60 or more, and is 1.00 or less, and may be 0.90 or less, 0.80 or less, or 0.70 or less. Further, "x" is 0 or more, and may be 0.10 or more, 0.20 or more, 0.30 or more, 0.40 or more, or 0.50 or more, and is 1.00 or less, and may be 0.90 or less, 0.80 or less, 0.70 or less, 0.60 or less, or 0.50 or less. Further, "y" is 0 or more, and may be 0.10 or more or 0.20 or more, and is 1.00 or less, and may be 0.90 or less, 0.80 or less, 0.70 or less, 0.60 or less, 0.50 or less, 0.40 or less, 0.30 or less, or 0.20 or less. Further, "z" is 0 or more, and may be 0.10 or more, 0.20 or more, or 0.30 or more, and is 1.00 or less, and may be 0.90 or less, 0.80 or less, 0.70 or less, 0.60 or less, 0.50 or less, 0.40 or less, or 0.30 or less. Element M is small contribution to charge and discharge. In this regard, in the above chemical composition, when p+q+r is less than 0.17, it is easy to secure a high charge and discharge capacity. p+q+r may be 0.16 or less, 0.15 or less, 0.14 or less, 0.13 or less, 0.12 or less, 0.11 or less, or 0.10 or less. On the other hand, by containing the element M, P2 type is easily stabilized. In the above chemical composition, p+q+r is 0 or more, and may be 0.01 or more, 0.02 or more, 0.03 or more, 0.04 or more, 0.05 or more, 0.06 or more, 0.07 or more, 0.08 or more, 0.09 or more, or 0.10 or more. The composition of O is approximately 2, but is variable without being limited to exactly 2.0.

2.2 Crystal Structure

Na containing oxide according to an embodiment has at least a P2 type structure (belonging to the space group P63mc) as a crystalline structure. Na containing oxide may have a P2 type structure and a crystalline structure other than the P2 type structure. Examples of the crystal structure other than P2 type structure include various crystal structures formed when Na is de-inserted from the P2 type structure. Here, Na containing oxide according to the present embodiment has a P2 type structure, while having a small O3 type structure. Na containing oxide according to the present embodiment may have a P2 type structure as a main phase. For example, when an X-ray diffraction pattern using CuKα as a ray source is acquired for a Na containing oxide according to the present embodiment, a ratio $I_{P2}/I_{O3}$ of a diffraction peak intensity $I_{P2}$ derived from a P2 type structure in the X-ray diffraction pattern and a diffraction peak intensity $I_{O3}$ derived from an O3 type structure may be 1.0 or more, 2.0 or more, 3.0 or more, or 4.0 or more. The upper limit of $I_{P2}/I_{O3}$ is not particularly limited, and may be, for example, 20.0 or less, 18.0 or less, 16.0 or less, 14.0 or less, or 12.0 or less.

The diffraction peak intensity $I_{P2}$ derived from P2 type structure is specified as follows.

(1) In the X-ray diffraction pattern using CuKα as a ray source, average intensity $I_{35.0}$ of the diffraction peak intensity at 35.0° ±0.2° is obtained as the background.

(2) In the X-ray diffraction pattern, maximum intensity $I_{39.85}$ of the diffraction peak intensity at 39.85°±0.1° is obtained. The peak at 39.85°±0.1° corresponds to the (102) of P2 type structure.

(3) $I_{39.85}$ minus $I_{35.0}$ is taken as the above $I_{P2}$ ($I_{P2}=I_{39.85}-I_{35.0}$).

The diffraction peak intensity $I_{O3}$ derived from O3 type structure is specified as follows.

(1) In the X-ray diffraction pattern using CuKα as a ray source, average $I_{35.0}$ of the diffraction peak intensity at 35.0°±0.2° is obtained as the background.

(2) In the X-ray diffraction pattern, maximum intensity $I_{38.0}$ of the diffraction peak intensity at 38.0°±0.2° is obtained. The peak at 38.0°±0.1° corresponds to the (012) of O3 type structure.

(3) $I_{38.0}$ minus $I_{35.0}$ is taken as the above $I_{O3}$ ($I_{O3}=I_{38.0}-I_{35.0}$).

Na containing oxide according to an embodiment may be a single crystal made of one crystallite or a polycrystal having a plurality of crystallites. For example, Na containing oxide according to an embodiment may be constituted by a plurality of crystallites on its surface. In other words, Na containing oxide may have a structure in which a plurality of crystallites are connected to each other on its surface. When the surface of Na containing oxide is constituted by a plurality of crystallites, crystal grain boundaries will be present on the surface. Here, the grain boundaries may be the inlet and outlet of the intercalation. In other words, when Na containing oxide is a polycrystal having a plurality of crystallites, an effect of increasing the entrance and exit of intercalation and lowering the reaction resistance, an effect of reducing the diffusion resistance by shortening the migration distance of sodium ions, an effect of reducing the absolute amount of the expansion and contraction amount at the time of charging and discharging, and an effect of making cracking difficult to occur, and the like can be expected. It is considered that the size of the crystallite may be large or small, but that the smaller the size of the crystallite, the larger the crystal grain boundary, and the above-described effect is easily exhibited. For example, when the crystallite constituting Na containing oxide has a diameter of less than 1 μm, higher performance is easily obtained. Incidentally, "crystallite" and "crystallite diameter" can be determined by observing the surface of Na containing oxide by scanning electron microscopy (SEM) or transmission electron microscopy (TEM). That is, the surface of Na containing oxide is observed, and when one closed area surrounded by the grain boundaries is observed, the region is regarded as a "crystallite". Determine the maximum Ferre diameter of the crystallite and consider it as the "crystallite diameter". Incidentally, if Na containing oxide is made of a single crystal, the particle itself can be said to be one crystalline, the largest Ferre diameter of the particle is the "diameter of the crystallite". Alternatively, the crystallite diameter can be determined by EBSD or XRD. For example, the crystallite diameter can be determined from the full width at half maximum of the diffracted line of XRD pattern based on Scherrer's equation. When the crystallite specified by any one of the methods has a diameter of less than 1 μm, Na containing oxide tends to exhibit higher performance.

2.3 Shape

P2 type structure is hexagonal and has a large diffusivity of Na ions. It is easy to grow crystals in a particular orientation. In particular, when at least one of Mn, Ni and Co is included as the transition-metal element constituting P2 type structure, crystals easily grow in a plate-like to a particular direction. Therefore, it is usual for Na containing transition-metal oxides having a P2 type structure to be plate-like grains having a large aspect-ratio, in which the growing direction of the crystals is biased in a particular direction. In contrast, Na containing oxide according to an embodiment may be a spherical particle as described above. When Na containing oxide is a spherical particle, as described above, the reactive resistance is lowered by reducing the crystallite size, and the diffusive resistance inside the particle tends to decrease. In addition, when applied to a secondary battery or the like, it is considered that the degree of flexion is reduced by spheronization and the sodium ion conduction resistance is lowered. Thus, for example, the rate characteristics are improved, and the reversible capacity is easily increased.

Na containing oxide according to an embodiment may be a solid particle, a hollow particle, or a particle having voids. Although there is no particular limitation on the size of Na containing oxide particle, it is considered that a smaller size is advantageous. For example, the mean particle diameter (D50) of Na containing oxide particles may be 0.1 μm or more and 10 μm or less, 1.0 μm or more and 8.0 μm or less, or 2.0 μm or more and 6.0 μm or less. The mean particle diameter (D50) is the particle diameter (D50, median diameter) at an integrated value of 50% in the particle size distribution on a volume basis by a laser diffractometry/scattering method.

2.4 Supplement

In summary, Na containing oxide according to an embodiment may be provided with, for example, the following configurations (1) to (4).

(1) the Na containing oxide has at least one element of Mn, Ni and Co; Na; and O as a constituent element.

(2) the Na containing oxide has a P2 type structure.

(3) When an X-ray diffraction pattern using CuKα as a ray source is acquired for the aforementioned Na containing oxide, a ratio $I_{P2}/I_{O3}$ of the diffraction peak intensity $I_{P2}$ derived from the P2 type structure in the X-ray diffraction pattern and the diffraction peak intensity $I_{O3}$ derived from an O3 type structure is 1.0 or more and 20.0 or less.

(4) the Na containing oxide is a spherical particle.

3. Use

The Na containing oxide having a P2 type structure produced by the above method is available as a positive electrode active material for a sodium-ion battery, for example. A sodium-ion battery according to an embodiment includes a positive electrode active material layer, an electrolyte layer, and a negative electrode active material layer, wherein the positive electrode active material layer includes, as a positive electrode active material, the Na containing oxide having a P2 type structure of the present disclosure described above. The sodium ion battery may have the same configuration as in the prior art, except that it includes the above-described specific positive electrode active material.

EXAMPLES

As described above, an embodiment such as a method of manufacturing a Na containing oxide having a P2 type structure has been described, but the manufacturing method and the like of the present disclosure can be variously modified other than the above embodiment without departing from the gist thereof. Hereinafter, the technique of the present disclosure will be described in further detail with reference to Examples, but the technique of the present disclosure is not limited to the following Examples.

1. Preparation of Na Containing Oxide Having P2 Type Structure 1.1 Preparation of Precursor (1) After weighing out $MnSO_4 \cdot 5H_2O$, $NiSO_4 \cdot 6H_2O$ and $CoSO_4 \cdot 8H_2O$ to the target compositional ratio, they were dissolved in distilled water to a concentration of 1.4 mol/L to obtain a first solution. In a separate container, $Na_2CO_3$ was dissolved in distilled water to a concentration of 1.4 mol/L to obtain a second solution.

(2) A 500 mL portion of the first solution and a 500 mL portion of the second solution were each added dropwise at a rate of about 4 mL/min into a reactor (with baffle board) already containing 800 mL of purified water.

(3) Upon completion of the dropwise addition, the mixture was stirred for 1 h at room temperature at a stirring speed of 150 rpm to obtain a product.

(4) The product was washed with purified water and subjected to solid-liquid separation using a centrifugal separator to obtain a precipitate.

(5) The precipitate was dried overnight at 120° C. and crushed with a mortar, and then the microparticles were removed out by gas-flow classification to obtain precursor particles. The precursor particles were spherical particles composed of composite salt containing Mn, Ni and Co, with a circularity of 0.80 or more.

1.2 Preparation of Composites (1) $Na_2\ CO_3$ as a Na source and the above precursor particles were weighed so that the composition after firing described later became $Na_{0.7}Mn_{0.5}Ni_{0.2}Co_{0.3}O_2$.

(2) The weighed Na source and the precursor particles were mixed by spray-drying. Specifically, the weighed Na source and the precursor particles were added to the solvents, Na source was dissolved, and spray-drying was performed on the dispersed solutions in which the precursor particles were dispersed. The spray-drying temperature was set at 200° C. and the spray pressure was set at 0.3 MPa. By spray-drying, the composites were obtained in which 75 area % of the surface of the precursor particles was coated with the Na source.

1.3 Firing the Composite

The composites 6g were placed in alumina crucibles and fired. The firing atmosphere is an air atmosphere for Comparative Example, an oxygen 92% atmosphere for Example 1, an oxygen 75% atmosphere for Example 2, and an oxygen 50% atmosphere for Example 3. In Examples 1 to 3, the oxygen concentration was changed by performing gas substitution in the system at the start of firing and changing the mixing ratio of pure oxygen and air. In addition, oxygen gas was flowed by 0.05 L/min during firing. Conditions in firing were as follows (1) to (7).

(1) An alumina crucible containing the above composite is installed in a heating furnace.

(2) Temperature in the heating furnace is raised from room temperature to 600° C. in 2 hours.

(3) The inside of the heating furnace is held at 600° C. for 2 hours, whereby preliminary firing is performed.

(4) After pre-firing, temperature in the heating furnace is raised to 900° C. from 600° C. in 2 hours.

(5) Maintaining the heating furnace at 900° C. for 1 hour, whereby main firing is performed.

(6) After the main firing, the temperature in the heating furnace is lowered from 900° C. to 250° C. in 4 hours.

(7) The alumina crucible is taken out from the heating furnace at 250° C., and allowed to cool to atmosphere.

Na containing oxide particles having a P2 type structure were obtained by grinding the fired product using a mortar after cooling in a dry atmosphere. Na containing oxide particles had a chemical composition represented by $Na_{0.7}Mn_{0.5}Ni_{0.2}Co_{0.3}O_2$.

2. Evaluation of Na Containing Oxide Particles 2.1 Appearance Observed by SEM

Figure 2:
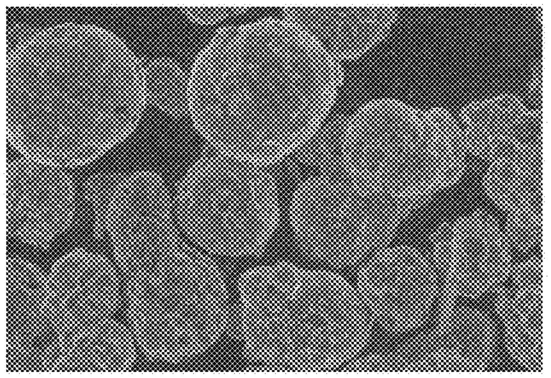
FIG. 2 is an external SEM photograph of Na content oxide according to Example 1.
Figure 3:
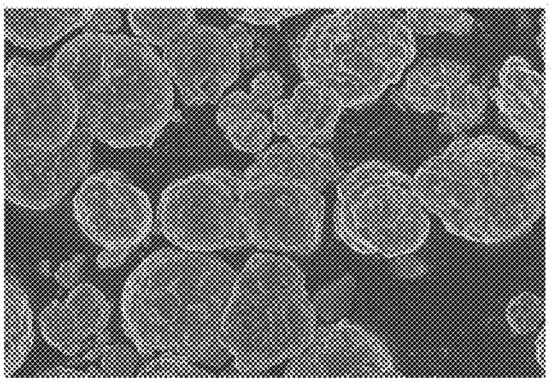
FIG. 3 is an external SEM photograph of Na content oxide according to Comparative Example.

FIG. 2 shows an external SEM photograph of Na containing oxide according to Example 1. FIG. 3 shows an external SEM photograph of Na containing oxide according to the Comparative Example. As is apparent from FIGS. 2 and 3, Na containing oxide according to Example 1 and Comparative Example is spherical particles having a circularity of 0.80 or more. Further, the surface of the spherical particles is constituted by a plurality of crystallites, and it can be seen that the crystallite diameter is less than 1 µm. Even with Na containing oxide according to Examples 2 and 3 was the same form as in Example 1.

2.2 Identification of Crystalline Structures by XRD

Figure 4:
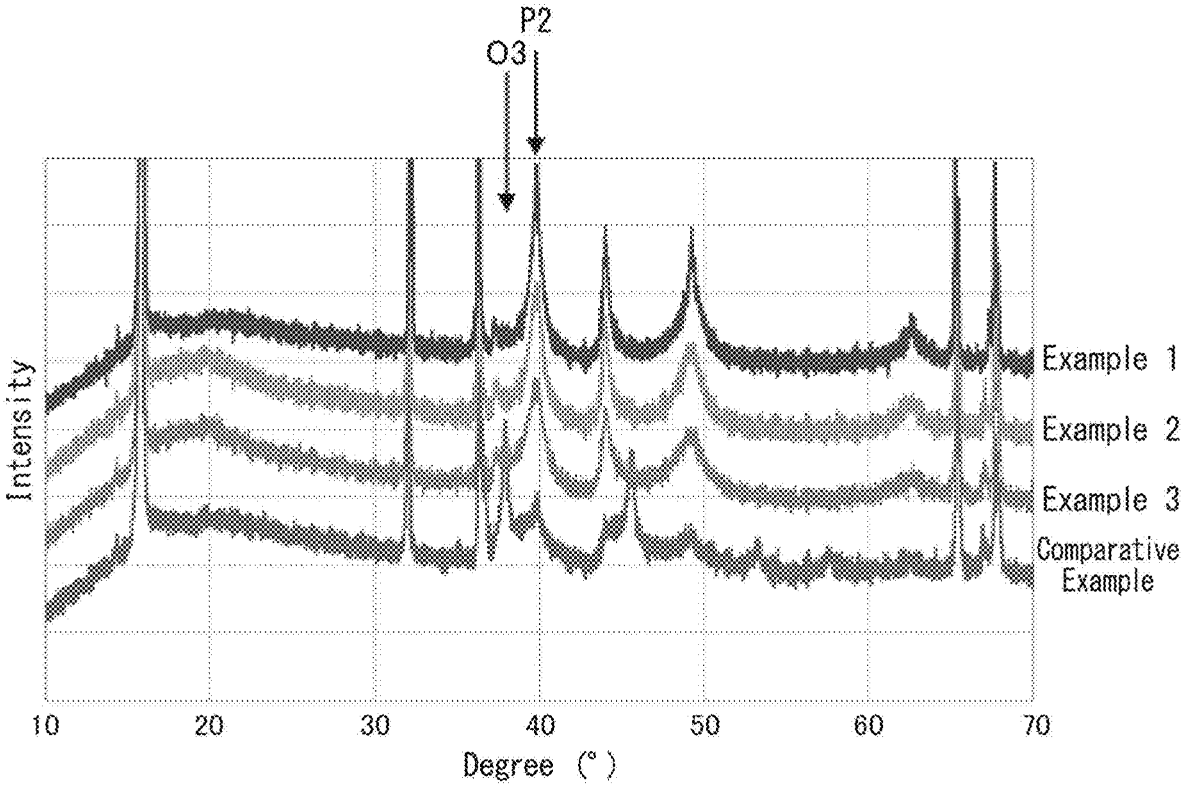
FIG. 4 shows X-ray diffraction patterns of Na containing oxides of Examples 1 to 3 and Comparative Example.
Figure 5:
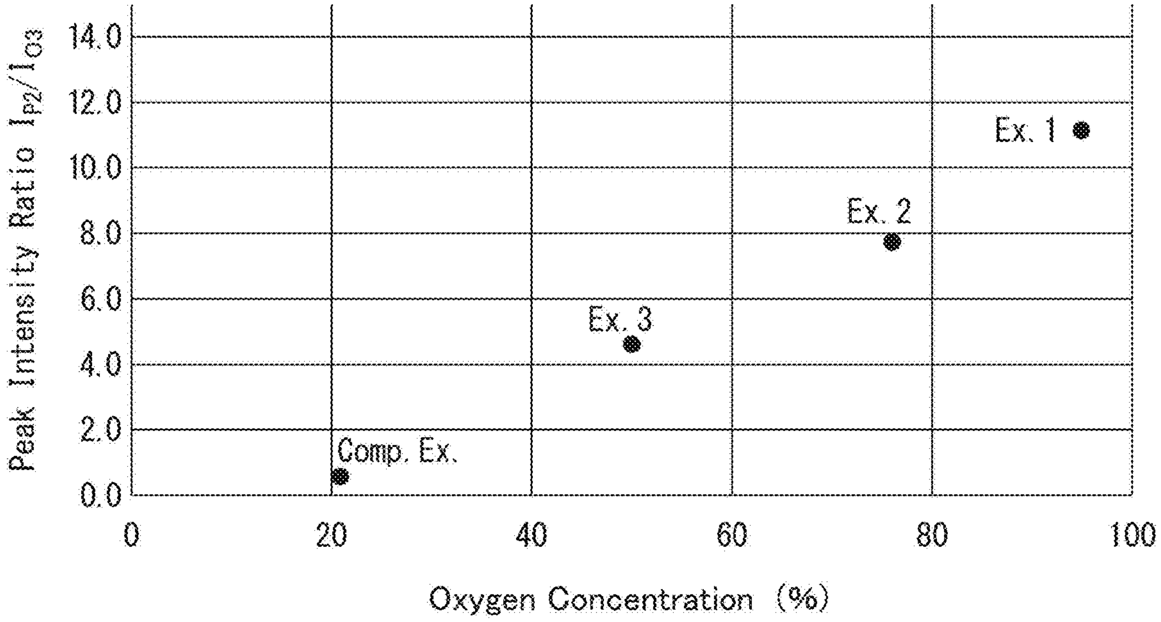
FIG. 5 shows relation of oxygenation at the time of firing and peak-intensity-ratio $I_{P2}/I_O$.

For each of Na containing oxides of Examples 1 to 3 and Comparative Example, X-ray diffraction measurement using CuKα as a ray source was performed, and an X-ray diffraction pattern was acquired, and a ratio $I_{P2}/I_{O3}$of the diffraction peak intensity $I_{P2}$ derived from P2 type structure and the diffraction peak intensity $I_{O3}$ derived from O3 type structure was determined from the X-ray diffraction pattern. FIG. 4 shows the X-ray diffraction patterns of Na containing oxides of Examples 1 to 3 and Comparative Example. Further, FIG. 5 shows the relationship between the Oxygen content during firing and the peak intensity ratio $I_{P2}/I_{O3}$. As shown in FIGS. 4 and 5, for Na containing oxide according to the comparative example, the peak intensity ratio $I_{P2}/I_{O3}$ of the diffraction peak intensity $I_{P2}$ derived from P2 type structure and the diffraction peak intensity $I_{O3}$ derived from O3 type structure is less than 1.0, i.e., containing many O3 phase. In contrast, Na containing oxides according to Examples 1 to 3 had a ratio $I_{P2}/I_{O3}$of 1.0 or more, and as compared with the comparative example, the quantity of O3 phase was greatly reduced. In Examples 1 to 3, it is considered that the generation of O3 phase was suppressed by the fact that the oxygen-concentration at the time of the main firing was 50% by volume or more.

3. Supplement

Note that, in the above examples, a case in which a precursor is obtained by a coprecipitation method has been exemplified, but a precursor can be obtained by a method other than this. In addition, in the above example, a case in which the surface of the precursors is coated with a Na source by spray drying to obtain a composite has been exemplified, but the composite can also be obtained by other methods. In addition, in the above example, a Na containing oxide having a P2 type structure has been exemplified as an oxide having a predetermined chemical composition, but the chemical composition of Na containing oxide is not limited thereto. A variety of chemical compositions adopting P2 type structures may be used, Na containing oxide may be doped with an element M other than Mn, Ni and Co. The element M is as described in the embodiment. In addition, in the above example, a case in which a spherical precursor is used to finally obtain spherical Na containing oxide particle has been exemplified, but the precursor and Na containing oxide are not limited to spherical particles. However, when spherical particles are used, for example, a high effect can be expected as a positive electrode active material for a battery.

4. Summary

As described above, according to a method for producing a Na content oxide having a P2 type structure comprising the following steps S1 to S3, it is possible to suppress the generation of O3 phase in the Na containing oxide. In other words, it is possible to produce a Na containing oxide having a P2 type structure and a reduced O3 phase.

S1: a precursor comprising at least one element of Mn, Ni and Co is obtained.

S2: the surface of the precursor is coated with a Na source to obtain a composite.

S3: the composite is fired to obtain the Na containing oxide having a P2 type structure, wherein the atmosphere in firing the composite contains 50% by volume or more of oxygen.

Further, according to the above method, for example, the Na containing oxide satisfying the following configurations (1) to (4) is obtained. That is, (1) the Na containing oxide has at least one element of Mn, Ni and Co; Na; and O as constituent elements.

(2) the Na containing oxide has a P2 type structure construction.

(3) when obtaining an X-ray diffraction pattern using CuKα for the Na containing oxide, a ratio $I_{P2}/I_{O3}$ of the diffraction peak intensity $I_{P2}$ derived from the P2 type structure in the X-ray diffraction pattern and the diffraction peak intensity $I_{O3}$ derived from an O3 type structure is 1.0 or more and 20.0 or less.

(4) the Na containing oxide is a spherical particle.

The invention claimed is:

1. A method for producing a Na containing oxide having a P2 type structure, the method comprising:

obtaining a precursor comprising at least one element of Mn, Ni and Co, coating a surface of the precursor with a Na source to obtain a composite, and firing the composite to obtain the Na containing oxide having the P2 type structure, wherein:

an atmosphere in firing the composite comprises 50 volume % or more of oxygen, when obtaining an X-ray diffraction pattern using CuKα for the Na containing oxide, a ratio $I_{P2}/I_{O3}$ of a diffraction peak intensity $I_{P2}$ derived from the P2 type structure in the X-ray diffraction pattern and a diffraction peak intensity $I_{O3}$ derived from an 03 type structure is 1.0 or more and 20.0 or less, the obtaining the precursor comprising the at least one element of Mn, Ni, and Co comprises precipitating the precursor, and the coating the surface of the precursor with the Na source comprises spray drying.

2. The method according to claim 1, wherein the precursor is a spherical particle, the composite is obtained by coating 40 area % or more of the surface of the precursor with the Na source and the Na containing oxide having the P2 type structure is a spherical particle.

3. The method according to claim 2, the method comprising obtaining a precipitate as the precursor by a coprecipitation method using an ion source capable of forming the precipitate with transition metal ions in an aqueous solution and a transition metal compound comprising at least one element of Mn, Ni and Co.

4. The method according to claim 1, wherein the Na containing oxide having P2 type structure has a chemical composition represented by $Na_aMn_{x-p}Ni_{y-q}CO_{z-r}M_{p+q+r}O_2$ (wherein, $0<a\leq1.00$, $x+y+z=1$, $0\leq p+q+r<0.17$, and element M is at least one of B, Mg, Al, K, Ca, Ti, V, Cr, Fe, Cu, Zn, Ga, Ge, Sr, Y, Zr, Nb, Mo and W).

5. The method of claim 4, wherein the Na containing oxide consists of Na, Mn, Ni, Co, and O atoms.

6. The method of claim 4, wherein the precursor comprises Mn, Ni, and Co atoms.

7. The method of claim 6, wherein the firing the composite occurs for from 30 minutes to 3 hours.

8. The method of claim 7, wherein the firing the composite occurs at a temperature of from 700° C. to 1100° C.

* * * * *